United States Patent [19]
Holt et al.

[11] 3,952,859
[45] Apr. 27, 1976

[54] INTERMITTENT DRIVE FOR ROLL WRAPPER

[75] Inventors: Ronald Holt; Paul W. Birman, Jr., both of Battle Creek, Mich.

[73] Assignee: Franklin Electric Subsidiaries, Inc., Bluffton, Ind.

[22] Filed: June 6, 1975

[21] Appl. No.: 584,630

[52] U.S. Cl. ............................. 198/110; 74/84 R; 198/34
[51] Int. Cl.² ........................................ B65G 23/30
[58] Field of Search ............... 198/34, 76, 110, 203; 74/84, 116, 122, 125

[56] References Cited
UNITED STATES PATENTS

| | | |
|---|---|---|
| 3,015,236 | 1/1962 | Toensing.................................. 74/84 |
| 3,178,007 | 4/1965 | Standley et al. ...................... 198/34 |
| 3,203,533 | 8/1965 | Hauer et al. .......................... 198/76 |
| 3,276,568 | 10/1966 | Hansen, Jr. et al................. 198/110 |
| 3,364,770 | 1/1968 | Button et al................... 198/110 X |

Primary Examiner—John J. Love
Assistant Examiner—Richard K. Thomson
Attorney, Agent, or Firm—Austin A. Webb

[57] ABSTRACT

A wrapping machine assembly accelerates articles from a supply conveyor to a wrapping conveyor. Separating bars moved in an orbit over the accelerating portion of the assembly enter into the gap between articles created by acceleration of the leading article or articles. The separating bars and the accelerating portion of the machine are driven intermittently by a drive transmission which is synchronized and driven cyclically with the wrapping conveyor. The intermittent drive which forms the novelty of this invention has a belt loop driven continuously in synchronism with the wrapping conveyor. The belt loop drives an accelerating conveyor and the separating bars, but the driving motion is converted to intermittent motion by a pair of idler rolls which engage the opposite reaches of the belt loop, and swing transversely of the belt reaches to alternately lengthen one reach and shorten the other reach. The idler rolls are carried on a swingable support, and the support is oscillated in the plane of the rolls and belt by crank or cam means driven by the input drive source to the intermittent drive.

10 Claims, 5 Drawing Figures

INTERMITTENT DRIVE FOR ROLL WRAPPER

RELATED APPLICATIONS AND PATENTS

This application relates to and is an improvement on the co-pending application of Ronald Holt, Ser. No. 553,475, filed 27 Feb. 1975.

OUTLINE OF INVENTION

The present invention lies in the structure for converting continuous and uniform rotary motion of a drive shaft to intermittent and variable speed rotary motion of the driven shaft to the accelerating conveyor and the separating bars. This is accomplished by providing a pair of idler rolls, or pinions, mounted on a support to constantly engage the insides of the opposite reaches of a belt, or chain loop between the driving and driven shafts. The support for the idler rolls is rockable in a plane parallel to the plane of the belt loop.

When the support is held stationary, the drive from the input shaft to the output shaft is constant. The ratio of the drive between the input and the output shafts depends on the relative sizes of the rolls, or sprockets, on the shafts which engage the belt loop. In the examples illustrated these rolls are equal size for a one to one drive; but this may be changed.

When the support for the idler rolls is moving, toward one reach of the belt loop and away from the other, the length of the one reach is increased and the other reach is shortened. As a result, continuous rotary motion of the driving roll or sprocket is either partially expended in taking up slack from the idler roll which is being retracted or pulling in increasing lengths of belt from the idler roll which is being extended. The other idler roll makes corresponding adjustments in the return or idler reach of the belt.

Movement of the idler rolls and their support is effected at predeterminable portions of the rotary cycle of either the driving shaft or the driven shaft by crank or cam linkages or combinations thereof. In the examples illustrated, shifting motion of the idler rolls and their support is tied to the rotational cycle of the drive shaft, so that speed variation of the accelerating belts and separating bars is directly tied and synchronized to the cycle of the wrapping machine from which the drive shaft is driven.

In the following description, the rotating and moving elements will be referred to as pulleys, rolls and belts; but these could obviously be changed to gears, sprockets and chains. There is no significant change in the length of the belt loop between the drive shaft and the driven shaft of the intermittent drive; but a yieldable spring support for one of the idler pulleys (not shown) could be added if desired. Shafts and bearings are conventionally illustrated.

The intermittent and variable drive can be used in any situation between a driving shaft and a driven shaft, and the association or combination with the conveyors and belts of a wrapping machine is an example only of the utility and operation of the drive.

DESCRIPTION

The drawings, of which there are three sheets, illustrate two alternative forms of the intermittent drive and the application of one of these to a wrapping machine.

Figure 1:
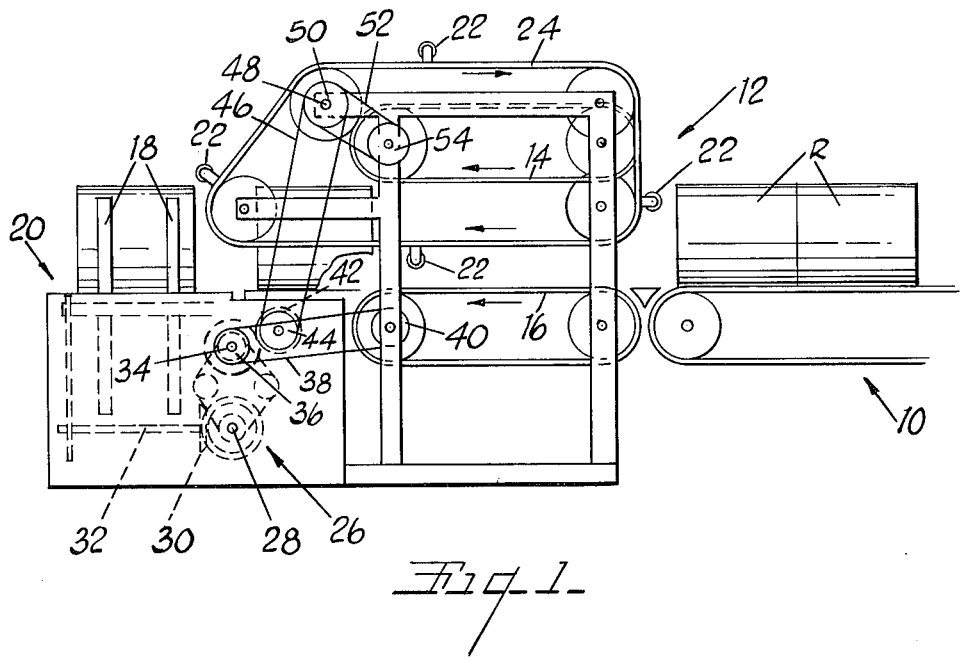
FIG. 1 is a side elevational view of the wrapping machine assembly having the intermittent drive of the invention incorporated therein.

The previously identified application of Holt shows an assembly of conveyor parts similar to that in FIG. 1, in which a series of articles such as tissue rolls R are fed continuously by an in-feed conveyor 10 to a separating and accelerating conveyor assembly indicated at 12. The assembly 12 functions to pick up single or predetermined groups of articles between an upper belt 14 and a lower belt 16 and advance them to the flights 18 of a wrapping machine conveyor 20 located at the left end of feeding mechanism. The articles are kept separated in package units or groups by separating bars 22 which are carried by belt loops 24 around the upper belt 14, and passing between belts 14 and 16.

Figure 2:
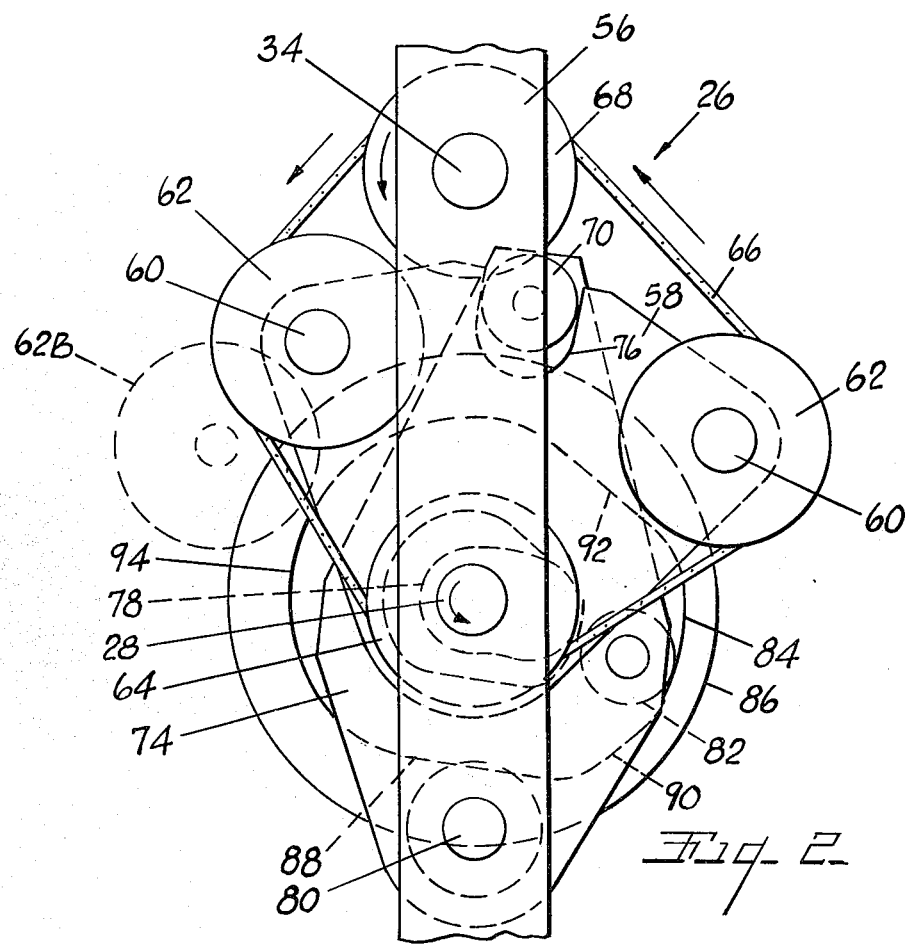
FIG. 2 is an enlarged side elevational view of a first form of the intermittent drive shown in FIG. 1.
Figure 3:
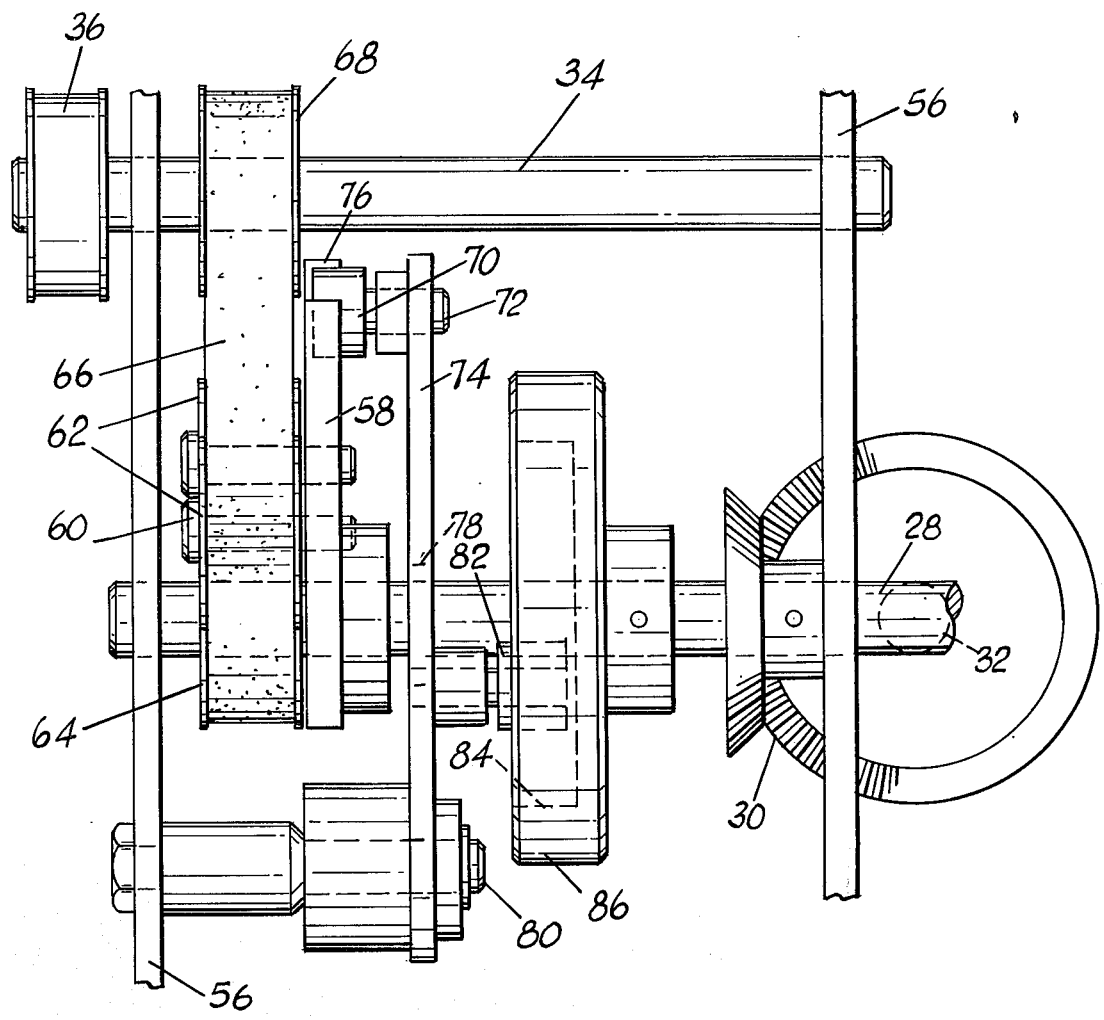
FIG. 3 is a top plan view of the intermittent drive shown in FIG. 2.

The movements of the accelerating belts 14 and 16, and of the belt loops 24 which advance the separator bars 22 are all synchronized to movement of the flights 18 of the wrapping machine conveyor 20 by an intermittent or change speed transmission indicated generally by the numeral 26, and shown more clearly in FIGS. 2 and 3. A primary or common drive shaft 28 drives both the wrapping machine conveyor 20, through bevel gears 30 and shaft 32, and the output shaft 34 of the intermittent transmission as will be described in greater detail presently. The output shaft 34 drives a pulley 36 and belt 38 to the drive pulley 40 for the lower accelerating belt 16. A rotation reversing gear 42 driven from the output shaft 34 drives a pulley 44 and belt 46 to the shaft 48 which drives the belt loops 24 for orbiting the separator bars 22. A pulley 50 on the near end of shaft 48 drives belt 52 to pulley 54 which rotates the drive shaft of the upper accelerating belt 14.

Turning to the details of the construction and operation of the intermittent drive 26 as shown in FIGS. 2 and 3, the reference numeral 56 represents fixed supporting frame or case structure for the input shaft 28 and the output shaft 34. Rockably supported on the input shaft near the front or left end thereof is a support plate 58, which is roughly diamond shaped in outline. Carried by the opposite side corners of the plate 58 are two stub shafts 60, each of which carries an idler pulley 62. Continuously driven by the input shaft and located in the plane of the idler pulleys 62 is a drive pulley 64. A belt loop 66 is trained around the pulleys 62 and 64 to a driven pulley 68 on the output shaft 34.

The rockably angular position of the support plate 58 on the shaft 28 is determined by a follower roll 70 carried by a pin 72 on the upper end of a shift lever 74 and engaged in a cam slot 76 in the upper corner of the support plate 58. The shift lever 74 has an elongated slot 78 which clears the shaft 28, and the lever extends downwardly to a fixed pivot on the stub shaft or pin 80 carried by the frame 56. Carried by one side of the shift lever adjacent the end of the slot 78 is a cam follower roll 82 which projects rearwardly, or to the right in FIG. 3. The follower roll 82 rides in the cam slot 84 of a box cam 86 which is carried and driven by the input shaft 28.

With particular reference to the front elevational view in FIG. 2, it will be seen that the irregular loop of the drive belt 66 remains essentially the same length (and driving tension) whether the idler pulleys 62 are in the extreme right hand tilted position of support plate 58 as shown in full lines, or is tilted reversely through a neutral upright position to an opposite extreme shown by the dotted position 62B. Accordingly, the speed ratio between the input shaft 28 and the output shaft is constant (and in this case one-to-one) whenever the support plate 58 is stationary. However, as and during the time in which the support plate may be tilted to the opposite extreme, the left or downward moving reach of belt 66 will be lengthened; thus pulling more belt than normally over pulley 68. At the same time the upwardly moving reach will be shortened, feeding a like amount of additional belt length to pulley 68. Thus, while the support plate and pulleys 62 are being tilted toward the downwardly moving working reach of the belt, the rotational speed of pulley 68 and driven shaft 34 will be increased relative to the speed of the input shaft. Reverse tilting of the support plate and position of the idler rolls causes an opposite change in the drive ratio and a slowing of the driven or output shaft. While the idler rolls are moving away from position 62B the downwardly moving working reach is actually feeding slack to the driving pulley 64. Depending on the rate of swinging of the supporting plate 58, the rotation of the output shaft 34 may be slowed, stopped or even reversed momentarily.

The arrangement of the contour of the box cam slot 84 determines the sequence of speed changes of the output shaft relative to the speed of the input shaft. This can of course be changed for different applications; but for the control of the accelerating conveyor assembly 12 in FIG. 1, the cam slot retracts or inclines radially inwardly as at 88 to a short outer arc 90. (See FIG. 2). It then angles radially inwardly at 92 to an inner constant arc 94. The box cam 86 which makes one revolution with the advance of each set of flight bars 18 of the wrapping machine is oriented on the shaft 28 to engage the short arc 90 as the separating bars 22 reach the positions shown in FIG. 1. In this position, one bar 22 is in blocking relation to delivery of an article R from the feed conveyor 10 to the accelerating belts 14 and 16. Another bar 22 at the left side of the carrier loop 24 has just advanced an article onto the conveyor 20, and a third bar is in position to transfer another article from the accelerating belts to the wrapping machine conveyor, all as is described more fully in the co-pending application identified at the beginning of the application.

It will be seen that from the position illustrated in the drawings the crank pin 70 will swing the support plate 58, and the idler rolls 62 toward their opposite extreme position 62B. This rapidly accelerates the drive to shaft 34, and belts 14 and 16 and the carrier loop 24 driven by it. When the inner portion 94 of the cam slot reaches the follower 82 the speed of the belts will remain constant (but faster than the speed of conveyor 10) for a period. During this portion of the cycle another article will be fed into the accelerating belts, and the next separating bar 22 will move down into the gap created between the articles by the acceleration of the leading article from conveyor 10.

Figure 4:
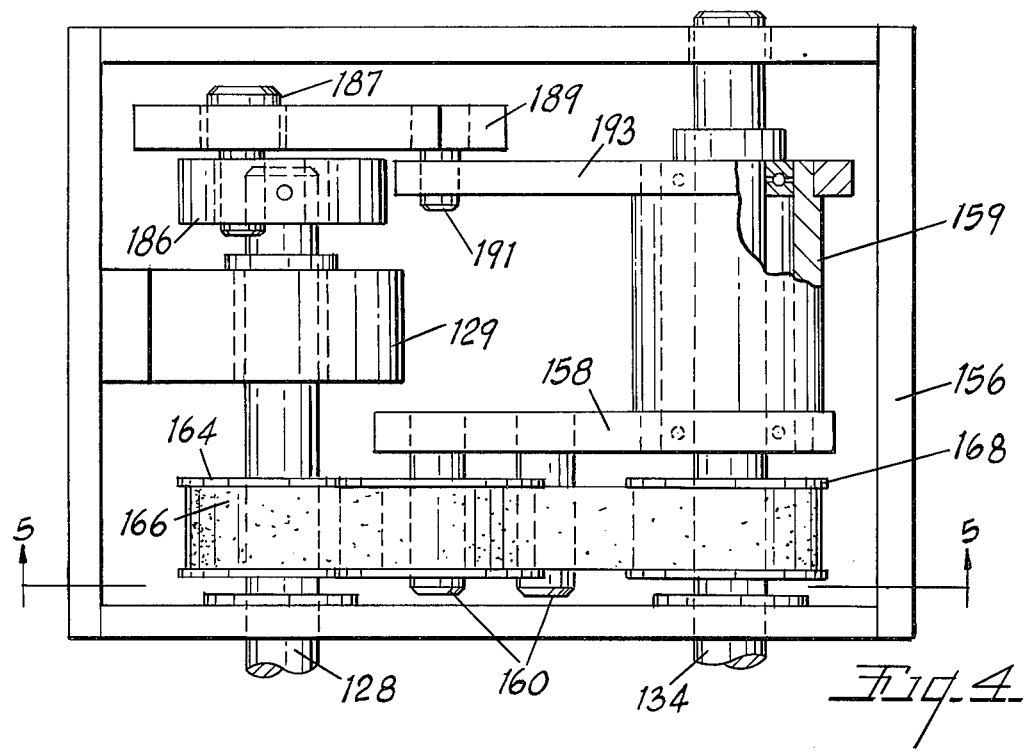
FIG. 4 is a top plan view, partially broken away, of an alternative modified form of the intermittent drive.
Figure 5:
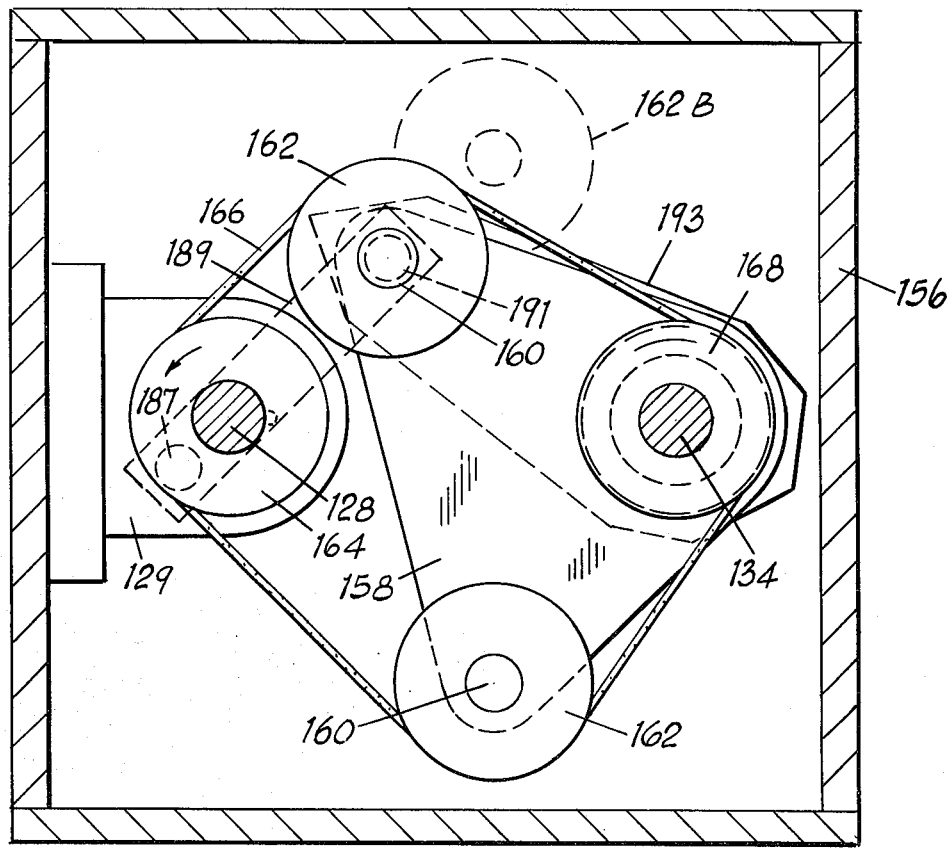
FIG. 5 is a vertical cross sectional view taken along the plane of the line 5—5 in FIG. 4, showing the intermittent drive in side elevation.

FIGS. 4 and 5 illustrate an alternative and modified form of the intermittent or change speed transmission. A case 156, corresponding to the fixed frame parts 56, supports an input shaft 128 by an inner bearing 129, and an output shaft 134 journaled in the walls of the case. A carrier plate 158 journaled on the output shaft 134 by means of the bearing sleeve 159, carries idler rolls 162 in the plane of a drive roll 164 on the drive or input shaft. A belt loop 166 trained around the drive roll and idler rolls drives a roll 168 on the output shaft. Shifting motion of the carrier plate 158 is initiated and produced by a crank wheel 186 on the inner or upper end of the input shaft. A crank pin 187 on the crank wheel engages and drives a link 189. The link connects to a pin 191 which is in turn connected to a crank arm 193 secured to the sleeve 159. A rocking motion is thus imparted to the sleeve 159 and the carrier plate, and causes oscillation of the idler rolls 162. As the rolls 162 oscillate, the speed of the output shaft either increases or decreases relative to the speed of the input shaft. As the crank pin 187 and link 189 pass through the extreme points of their throw, oscillation of the carrier plate is at a minimum and the speed differential between the two shafts is approximately constant, and zero.

The two modifications of the intermittent drive illustrated each initiate movement of the carrier plate from rotation of the input shaft. However, it is possible to connect and initiate the change speed movement in response to the rotational cycle of the driven or output shaft. By mounting or connecting either the box cam 86 or the crank wheel 186 to the output shafts 34 or 134 other patterns of cyclic speed variation may be obtained. Also, it is not necessary that the idler roll support plates be pivoted on the input shaft. The plates may pivot about the output shaft, or on a separate pivot so long as swinging motion of the idler rolls produces essentially equal lengthening and shortening of the working and return reaches of the belt between the two shafts.

What is claimed as new is:

1. In combination with a wrapping machine having a wrapping conveyor and an article feed conveyor with an article accelerating and separating conveyor disposed in article transferring relation between the first two conveyors, an intermittent drive connected to be driven in timed relation to said wrapping conveyor and to drive said accelerating conveyor, said intermittent drive comprising:

an input shaft,
 an output shaft in spaced parallel relation to said input shaft,
 coplanar rolls connected to said shafts to rotate therewith,
 an idler roll support member mounted to move transversely of the plane of said shafts and on opposite sides of the plane of the shafts,
 a pair of spaced idler rolls mounted on said support member in coplanar relation to the rolls on said shafts and on opposite sides of the plane of the shafts,
 a belt loop trained around said rolls on said shafts and said idler rolls,
 and cyclically operated means driven continuously by one of said shafts and connected to oscillate said support member toward and away from the plane of said shafts.

2. The combination as defined in claim 1 in which said support member is pivoted about one of said shafts.

3. The combination as defined in claim 2 in which said support member is pivoted on said input shaft.

4. The combination as defined in claim 2 in which said cyclically operated means is connected to be driven by said input shaft.

5. The combination as defined in claim 4 in which said cyclically operated means is a cam rotated by said input shaft,
- a rocking arm arranged to rock about a fixed pivot disposed in the plane of said shafts,
- follower means on said rocking arm and drivingly engaged with said cam,
- and means swingable connecting said rocking arm to said support member.

6. The combination as defined in claim 4 in which said cyclically operated means includes a crank pin rotated by said input shaft,
- and said support member is pivoted on said output shaft, and a connecting link connected in rocking relation between said pin and said support member.

7. The combination as defined in claim 5 in which said rocking arm is pivoted in the plane of said input and output shafts and on the opposite side of one of said shafts from the other.

8. An intermittent drive transmission for driving one part from another comprising:
- an input shaft,
- an output shaft in spaced parallel relation to said input shaft,
- coplanar rolls connected to said shafts to rotate therewith,
- an idler roll support member mounted to move transversely of the plane of said shafts and on opposite sides of the plane of the shafts,
- a pair of spaced idler rolls mounted on said support member in coplanar relation to the rolls on said shafts and on opposite sides of the plane of the shafts,
- a belt loop trained around said rolls on said shafts and said idler rolls,
- and cyclically operated means driven continuously by one of said shafts and connected to oscillate said support member toward and away from the plane of said shafts.

9. An intermittent drive as defined in claim 8 in which said support member is pivoted about one of said shafts.

10. An intermittent drive as defined in claim 9 in which said support member is pivoted on said input shaft.

* * * * *